Sept. 4, 1962  G. W. STOUDT  3,052,489
HOSE COUPLING WITH SEPARABLE REINFORCED LOCKING ARM
Filed Jan. 29, 1960  2 Sheets-Sheet 1

INVENTOR
GEORGE W. STOUDT
BY Scrivener & Parker
ATTORNEYS

Sept. 4, 1962  G. W. STOUDT  3,052,489
HOSE COUPLING WITH SEPARABLE REINFORCED LOCKING ARM
Filed Jan. 29, 1960  2 Sheets-Sheet 2

INVENTOR
GEORGE W. STOUDT

BY Scrivener & Parker

ATTORNEYS

United States Patent Office 3,052,489
Patented Sept. 4, 1962

3,052,489
HOSE COUPLING WITH SEPARABLE
REINFORCED LOCKING ARM
George W. Stoudt, Oberlin, Ohio, assignor to Bendix-Westinghouse Automotive Air Brake Company, Elyria, Ohio, a corporation of Delaware
Filed Jan. 29, 1960, Ser. No. 5,406
4 Claims. (Cl. 285—69)

This invention relates to couplings and more particularly to improved couplings for connecting together fluid pressure hoses of the type used between automotive tractors and trailers.

In the trade, couplings of the type herein described are commonly known as "glad hands" and when the vehicles are connected the operator connects the coupling from the air line on the towing vehicle with the air line on the towed vehicle. Common to such couplings have been their ability to be readily connected together by a relative twisting movement of two identical coupling halves and the ability of the couplings to be pulled apart in a straight line to prevent breaking of the air hoses when the towing vehicle moves away from the trailer either by accidental break-away or intentionally but with the operator's having neglected to disconnect the couplings in the usual manner. Heretofore, couplings of the foregoing type have usually comprised a unitary member which has been expensive and relatively difficult to manufacture and because the couplings of one manufacturer must, as a practical matter, be usable with the couplings of all other manufacturers, heretofore it has not been possible to vary materially the design of a coupling so as to lessen costs.

It is the object of the present invention to provide an improved coupling which can be manufactured considerably more economically than heretofore while still being entirely compatible with all commonly used couplings employed in the trade.

More specifically, it is an object of the invention to provide an improved coupling which is composed of a plurality of separately, economically manufactured, prefabricated parts which are readily assembled to provide a coupling having all the attributes of the prior unitary couplings but having considerably less cost.

Still another object of the invention is to provide a coupling of the foregoing nature which includes improved detent means for releasably locking two coupling members together against either normal twisting uncoupling or straight-line uncoupling in the event the tractor pulls away from the trailer with the couplings still connected.

Other objects and their attendant advantages will become apparent as the following detailed description is read in conjunction with the accompanying drawings wherein.

Figure 1:
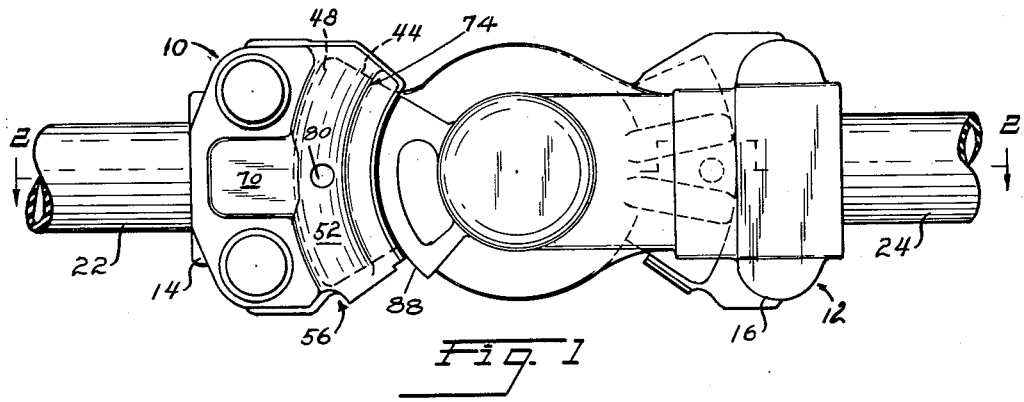
FIG. 1 is a bottom plan view of a pair of connected couplings manufactured in accordance with the invention.
Figure 2:
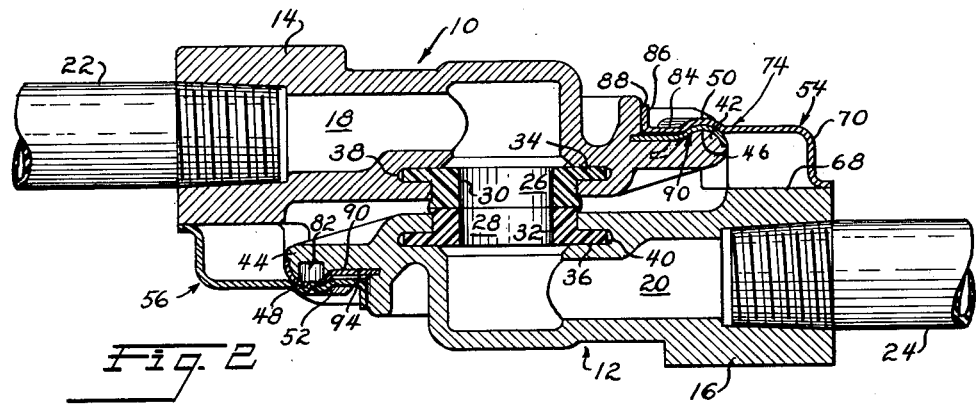
FIG. 2 is a vertical, cross sectional view taken substantially on the line 2—2 of FIG. 1.
Figures 3, 4:
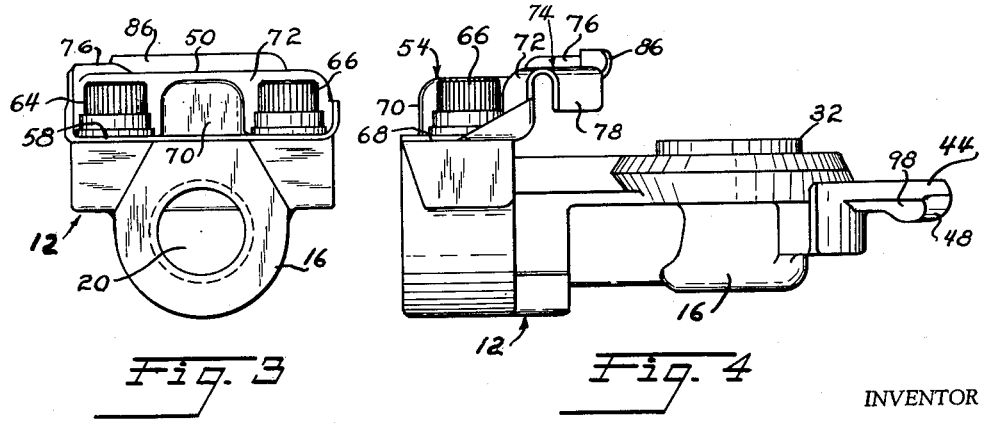
FIG. 3 is a vertical rear end of one coupling member.
FIG. 4 is a side elevation of the coupling of FIG. 3.
Figure 5:
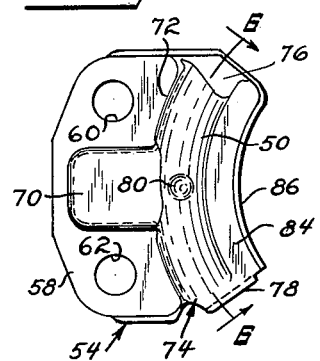
FIG. 5 is a top plan view of a lock arm member employed with the coupling of the invention.
Figure 6:
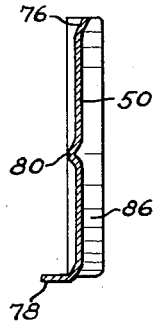
FIG. 6 is a cross sectional view taken substantially on the line 6—6 of FIG. 5.
Figure 7:
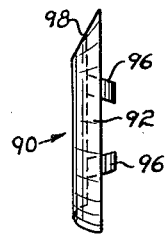
FIG. 7 is a front elevational view of a wear insert employed with the coupling of the invention.

Referring now to the drawings, and particularly FIGS. 1 and 2, two identical coupling members 10, 12 are shown in normal coupled condition with each coupling member comprising a unitary cast body 14, 16 respectively having cavities 18, 20 which are connected conventionally at the rear of the bodies to fluid conduits 22, 24 which may comprise tractor-trailer air pressure brake lines. The forward end of the bodies 14, 16 overlap and contain vertical passages 26, 28 each containing a respective elastic seal 30, 32 having an annular flange 34, 36 each received in an annular groove 38, 40 in the respective passages 26, 28, the arrangement being such that when the coupling members 10, 12 are coupled together the seals 30, 32 sealingly abut each other as shown in FIG. 2.

Each of the bodies 14, 16 has a respective extension 42, 44 which extends forwardly beyond the passages 26, 28 and at the end of each extension there is a respective arcuate rib 46, 48 which is adapted to be engaged behind a mating arcuate locking surface 50, 52 on respective improved lock arms 54, 56 constructed in accordance with the invention and hereinafter described in detail.

As so far described, those skilled in the art will recognize that except for the lock arm and other details of the invention which are described hereinafter, the couplings of the invention and particularly the body portions 14, 16 are substantially the same in structure and function as the corresponding parts of couplings now in the trade. Such couplings, however, have had the disadvantage of being difficult and expensive to manufacture because the lock arms have been cast integral with the body parts. Further, because these prior lock arms are substantially rigid with only slight resiliency, it has been necessary to provide such arms with separate spring-loaded detent means for releasably locking the couplings together against accidental disconnection. Such separate detent means are individually expensive and additional labor is required to assemble the detent means in each coupling thereby adding significantly to their cost.

In accordance with the invention, the additional cost of casting and finishing a unitary coupling and the additional expense of separate detent means are all substantially reduced by the provision of a lock arm for each coupling which is manufactured separate from the coupling body of stamped, strip steel and is thereafter quickly and easily assembled to the coupling body in any convenient manner as by machine screws. By employing strip steel in lieu of the relatively quite rigid integral lock arms employed heretofore there is sufficient resiliency in the entire arm of the invention so that merely a stamped indentation which is engageable with a hole in the lock rib of the mating coupling provides sufficient detent locking without the necessity of any separate detent means as in the prior art.

The lock arm 54 as illustrated in FIGS. 3 through 6 comprises a unitary stamped member of strip steel having a flat rear portion 58 containing holes 60, 62 adapted to receive machine screws 64, 66 for attaching the lock arm to a flat 68 formed on the rear part of the coupling body member. The central part of the flat portion 58 may have formed therein an integral upstanding hollow part 70 which serves to strengthen the lock arm. Connected to the forward edges of the parts 58, 70 is a vertical arcuate wall 72 which has extending forwardly from the upper edge thereof a flange 74 which, as indicated in FIG. 2, is provided with the aforementioned arcuate locking surface 50 beneath which the lock rib 46 of the mating coupling is engaged by a twisting action of the couplings with respect to each other. One side of the lock arm is open and the upper surface of the flange 74 on that side may be sloped upwardly as shown at 76 in FIG. 6 to permit the ready insertion of the lock rib 46 into the space beneath the flange 74 defined by the lock surface 50 and to provide a reinforcing means for the flange 74. At the opposite side of the lock arm, there is provided a downwardly bent portion 78 which serves as a stop for the rib 46. Intermediate the ends of the lock surface 50 is a downwardly protruding indentation 80 which may be formed in the lock arm during the stamping process. In accordance with invention this indentation releasably engages in detent fashion a hole centrally located in each lock rib of the mating coupling as illustrated at 82 in FIG. 2. Each of said holes in the coupling of the invention is of a size to receive either an indentation from a mating coupling or the invention or to receive the usual spring loaded detent of the type used in the one-piece couplings of the prior art.

Integral with the forward edge of the lock surface 50 of the lock arm is the horizontal part 84 at the outer end of which is an arcuate upturned flange 86 adapted to engage a mating vertical surface 88 on the opposite coupling member, the surface 88 being common both to the coupling of the invention and to conventional couplings so that the coupling of the invention is interchangeable with conventional couplings. The upturned flange 86 prevents the couplings from moving longitudinally toward each other. Flange 86 also provides a reinforcing means for the flange 74.

Figure 8:
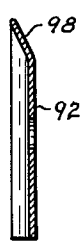
FIG. 8 is a cross sectional view of the insert of FIG. 7 taken substantially on the line 8—8 of FIG. 9.
Figure 9:
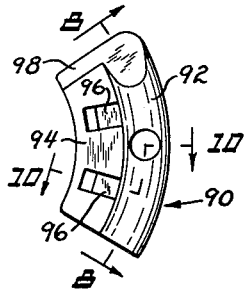
FIG. 9 is a top plan view of the wear insert of FIG. 7.
Figure 10:
FIG. 10 is a cross sectional view taken substantially on the line 10—10 of FIG. 9.

In order to further reduce the cost of couplings, the present invention contemplates the body parts being cast of a relatively soft, inexpensive metal with the lock ribs thereof, which are the only parts subject to appreciable wear, being covered with a strong wear-resistant insert 90 which may be of stainless steel strip and is more clearly illustrated in FIGS. 7 through 10. The insert is formed as a unitary stamping having an arcuate forward part 92 for covering the cast lock rib of the coupling and a relatively flat rear part 94 whose rear edge is adapted to be imbedded into the casting of the body part as shown in FIG. 2. Strikeouts 96 may further be provided for insuring that the insert is locked in place and the leading edge 98 of the insert may be sloped as shown in FIGS. 8 and 9 to facilitate the engagement of the lock rib with its mating lock arm.

From the foregoing description the manner of use of the invention should be obvious. As explained, two couplings are connected together by mutual engagement of their locked ribs with the lock arms and the members are then twisted together, the inherent resiliency of the strip steel lock arms being sufficient to enable the members to be twisted by hand with respect to each other until the indentations 80 on each arm register with the central holes in the mating lock ribs whereupon the indentation snaps into the hole and serves as a detent. In the event of a longitudinal pull on the couplings greater than a predetermined amount but less than the breaking strength of the hoses the lock ribs pull directly out from beneath the lock surface of the engaged lock arms with the arcuate surface of the ribs acting as a cam.

From the foregoing description it will be apparent that the present invention provides a coupling which is more economically manufactured than prior couplings and has all of the attributes of couplings of a prior art as to efficiency and interchangeability. A particularly valuable feature of the present invention resides in the provision of a separate prefabricated lock arm which may be formed by a single stamping operation of inherently springy material so that the entire lock arm operates as a detent spring to releasably retain two couplings together against either accidental twisting disconnection or straight-line disconnection except under circumstances where the flexible hoses are apt to be broken. It will be apparent to those skilled in the art that the coupling of the invention is susceptible of a variety of modifications without, however, departing from the scope and spirit of the appended claims.

What is claimed is:
1. A coupling member for use with a mating coupling member for connecting hose lines capable of carrying fluid under pressure, said member comprising a body member for connection to an end of a hose line and having a fluid passage therein co-axial with said line and having an opening at right angles thereto, terminating at a substantially planar surface, said opening adapted to receive a resilient gasket, a lock rib integral with said body member and extending forwardly of said opening and having a portion thereof below said planar surface, said lock rib being arcuate in shape and having a hole intermediate the ends thereof, said body member having a flat surface rearwardly of said opening, a lock arm member separate from said body member comprising a unitary body formed of resilient sheet material and including a flat rearwardly extending part contacting the flat surface of said body member, fastening means rigidly and immovably connecting said flat part of said lock arm with the flat surface of said body member, a substantially vertical wall part integral with the forward edge of said flat part, a forwardly extending part integral with the upper edge of said vertical wall part and having an arcuate forward edge concentric with said opening, an arcuate locking surface formed in said forwardly extending part and complementary in shape with said forwardly extending lock rib, an arcuate reinforcing means integral with the forward edge of said forwardly extending part for engagement with a complementary abutment on a mating coupling member, a second reinforcing means extending from said last named means and integral with said forwardly extending part, a downwardly extending flange integral with one side edge of said forwardly extending part and overlying the adjacent end of said locking surface so as to afford a stop for a lock rib when the latter is engaged by a relatively rotary movement with said locking surface, and a downwardly extending protrusion formed integral with said locking surface intermediate the ends thereof for resiliently releaseably engaging the hole in a mating lock rib when said opening is moved into registry therewith and enabling separation of the mating couplings by relative longitudinal movement of one with respect to the other.

2. A coupling member in accordance with claim 1 wherein the first named reinforcing means comprises a vertical flange.

3. A coupling member in accordance with claim 1 wherein said second reinforcing means comprises an upwardly and outwardly sloping flange on the side of the said forwardly extending part opposite said downwardly extending flange to facilitate the engagement of a mating lock rib with said locking surface.

4. A coupling member in accordance with claim 1 wherein the flat rearwardly extending part of the lock arm member is formed with an integral upstanding hollow part for strengthening said lock arm member.

References Cited in the file of this patent

UNITED STATES PATENTS

| 930,406 | McDonald | Aug. 10, 1909 |
| 961,699 | Jewett et al. | June 14, 1910 |
| 1,792,189 | Robinson | Feb. 10, 1931 |
| 2,153,533 | Davis | Apr. 11, 1939 |
| 2,869,140 | Bonacci | Sept. 14, 1954 |

FOREIGN PATENTS

| 10,170 | Great Britain | May 25, 1894 |

UNITED STATES PATENT OFFICE
CERTIFICATE OF CORRECTION

Patent No. 3,052,489 September 4, 1962

George W. Stoudt

It is hereby certified that error appears in the above numbered patent requiring correction and that the said Letters Patent should read as corrected below.

Column 3, line 10, for "or", first occurrence, read -- of --; line 58, for "a" read -- the --; column 4, line 40, for "opening" read -- hole --.

Signed and sealed this 15th day of January 1963.

(SEAL)
Attest:

ERNEST W. SWIDER
Attesting Officer

DAVID L. LADD
Commissioner of Patents